Figure 1:
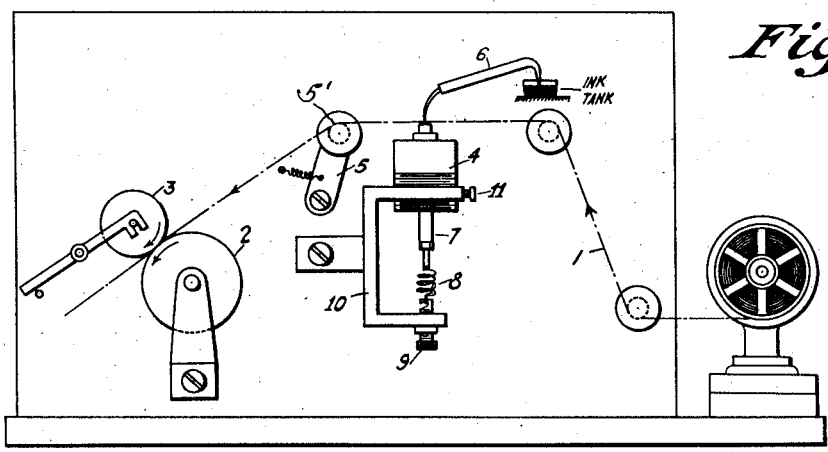

June 16, 1931.     H. CHIREIX     1,809,821

RECORDING APPARATUS FOR WIRE AND WIRELESS TELEGRAPHY

Filed April 12, 1928

INVENTOR
HENRI CHIREIX

BY
ATTORNEY

Patented June 16, 1931

1,809,821

UNITED STATES PATENT OFFICE

HENRI CHIREIX, OF PARIS, FRANCE, ASSIGNOR TO SOCIETE FRANCAISE RADIO ELECTRIQUE, OF PARIS, FRANCE, A JOINT-STOCK COMPANY OF FRANCE

RECORDING APPARATUS FOR WIRE AND WIRELESS TELEGRAPHY

Application filed April 12, 1928, Serial No. 269,339, and in France April 14, 1927.

The present invention relates to high speed recording apparatus for use in wire and wireless telegraphy. The apparatus nowadays used in radio-telegraphy for the recording of Morse signals, under normal conditions, does not permit of a working speed in reception higher than 225 words per minute. Indeed, the majority of standard recorder apparatus is not able to insure speeds over 150 words per minute.

In order that an operator may be able to work satisfactorily for several hours in a stretch, and if the traffic is to be reliable, it is imperative that the signals should be absolutely clear.

In recorders producing an undulated line record of dots and dashes of the Morse code which can be read from the length of the signal, the undulations should have a height of at least 6 mm. for proper legibility.

There is known in the prior art certain undulatory recorders which insure a speed up to 310 words per minute. In this case the height of the signals is not over from 2 to 3 mm, with the result that they can not be clearly read under normal service conditions.

The present invention is concerned with an apparatus whose inscription upon the paper tape or band is in the shape of dashes whose length is proportional to the duration of the incoming signals, just as in the standard Morse apparatus.

This method of recording affords easier means and ways of increasing the speed of receiving signals and includes the use of a receiver electromagnet disposed in such a way that it has a very small time-constant; the electromagnet is made to do a minimum amount of work in that the travel of the plunger is only a few fractions of a millimeter and thereby raises a very short piece or length of the paper tape, while the inertia of the mobile pieces is reduced to a minimum amount.

The apparatus as here disclosed presents several advantageous features. Stray signals, if present at all, are readily distinguishable, in that they show up in the majority of instances in the form of supplementary dots or points between the regular dots and dashes of the incoming text. If the unwinding of the paper band is uniform, such irregularities as are due to stray signals will be readily distinguishable so that they can be satisfactorily eliminated or disregarded in reading the record.

Figures 1A, 2:
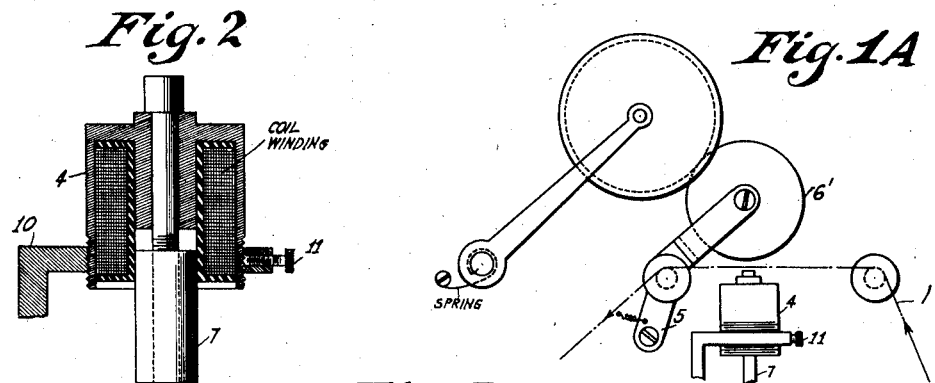
Figure 3:
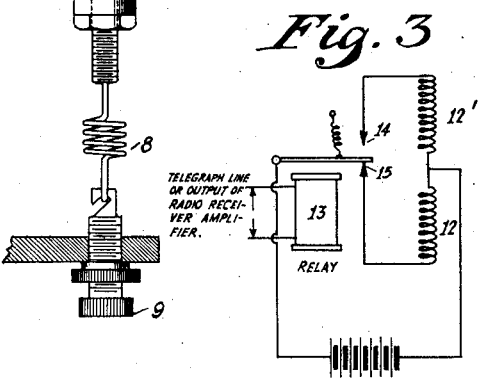
Figure 4:
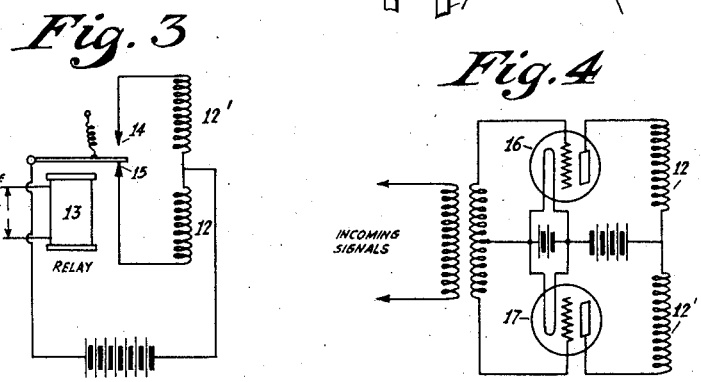

In the drawings,

Figures 1 and 1A show diagrammatically so much of the recording apparatus to properly understand the invention, Figure 2 shows a detailed view of the recording electro-magnet, and Figures 3 and 4 show detail constructions.

An apparatus built in accordance with the present invention has been able to achieve a working speed of 600 words per minute, and is distinguished from the standard Morse apparatus, though involving the general arrangement of the latter, by the following features:

(1) The use of a metallic pen, stylus or blade supplied conveniently; for example, directly from a container or else by the intermediary of a syphon;

(2) The use of an extremely small plunger electromagnet whose plunger core causes the paper to come directly in contact with the stylus or pen by action of the incoming current;

(3) Increase of paper tape feeding speed to values of, say, 60 meters per minute, although it will be understood that this rate is merely cited by way of example.

The apparatus comprises preferably the following elements and features, although any mechanical equivalents may be substituted therefor. A recording paper tape 1 is conveyed between two rollers 2, 3 brought to press upon each other, rotation of said rollers being produced by clockwork mechanism, electric motor, gravity (weight) motor, or the like, while the speed of rotation of the said rollers is regulated by some convenient speed-control device (not shown).

An electromagnetic plunger device 4 responsive to incoming signals is arranged to coact with said recording tape. The tape is tautened above the keeper of the electromagnetic plunger device through the agency of a yielding or spring tensioned arm 5 having a roller 5' at the end thereof. The electromagnet is arranged underneath the tape in such a way that the plunger core is disposed exactly opposite the stylus, the latter being fed from a siphon 6 which dips into the ink tank.

The core 7 of the electromagnet is restored to its normal position of rest by virtue of gravity and by a spirng 8 whose tension or force is regulated by means of a regulating screw 9.

The entire assembly of the electromagnet is vertically shiftable by means of the bracket 10 and set screw 11 to bring the end of the plunger in contact with the tape when the electromagnet is not energized by any current. The height or lift of the pen and its position or orientation may be adjusted in any well-known manner.

Instead of the pen, there could also be used for inking, the end of a flattened siphon which is of capillary thickness at the end, for example, of an order of some tenths of one mm. The recording system could also consists of a stylograph comprising a reservoir or tank and fed optionally from a siphon.

To tauten or tension the paper tape, the resilient or spring arm could be replaced by a brake device, regulated or non-regulated, and consisting simply of a rodlet subject to the pushing action of a spring, and coming to rub on the tape at a convenient point of its "stroke" or travel between the paper reel and the part of the paper tape raised by the plunger electromagnet. It will be understood, of course, that any other means adapted to keep the paper tape tensioned may be employed.

The plunger electro-magnet adapted to push the paper may comprise two parts placed in alinement with reference to each other, each thereof enclosing a coil 12, 12' acting upon the same plunger core and disposed in such a way that they act in opposite directions upon the plunger.

In the winding of one of said coils, current is passed during the working intervals coinciding with the coming in of signals, while the other winding is energized by current during the intervals between signals or spaces. By means of such a device, the core is restored at great speed to its normal or resting position, and this insures a corresponding increase in the rate of speed of reception.

In the practical application of the above idea, a relay 13 must be inserted, as shown in Figure 3, between the radio receiver amplifier (or the telegraph line) and the recorder, the said relay to be furnished with a back (rest) contact 14 and a working contact 15 as in most modern telegraph relays.

One of the windings 12 of the twin type plunger electro-magnet is connected with the working contact, whereas the other one 12' is associated with the back rest contact (space contact).

The electro-mechanical relays could be replaced by thermionic relays 16 and 17, as shown in Figure 4, comprising, for example, two triode tubes in the plate circuits of which the windings 12 and 12' are inserted. The two tubes are connected in such manner that the current in the plate circuit of one triode should reach a maximum value while the current in the other is of zero or of a very low value, and this can always be realized without any special difficulty.

Having thus described my invention, what I claim is:

1. Recorder apparatus of the class described comprising a plunger electro-magnet adapted to directly push the paper tape against the inking means, and a pair of coil windings associated with said plunger, one of said windings being energized by the received signals, and the other of which being energized during the spacing or silent periods.

2. In a recorder, a stylus, a recorder strip, means for feeding the strip past the stylus, a member adapted to be moved against the strip by radio current impulses whereby the strip contacts the stylus, and electrically operated means for moving the member in the opposite direction.

3. In an indicator for electric impulses, a stylus, a recording strip, means for moving the strip past the stylus, an electro-magnet, a member actuated by the latter and only moving in a plane normal to the plane of the strip, said member moving said strip out of its normal path of travel when the electromagnet is energized by said impulses, and electrical means for moving said member in the opposite direction.

4. In a recorder, a stylus, a recorder strip, means for feeding the strip past the stylus, a member adapted to be moved into contact with the strip, means responsive to signal energy for moving said member and additional means responsive to electric energy for moving said member in a different direction.

5. Recorder apparatus provided with paper tape comprising an inking means, a plunger adapted to push the tape against the inking means, a pair of means responsive to electric energy associated with said plunger, one of said means being responsive to signal energy, and the other means being rendered operative during inoperative periods of said first means.

6. In a recorder, marking means, a recorder strip, means for moving said strip past said marking means, and a member movable only in a plane normal to the plane of the strip and adapted to move said strip in a path normal to its direction of travel when said member is energized by radio current impulses, and electrical means for moving said member in the opposite direction.

7. Recording apparatus provided with a recording tape and including, marking means located adjacent the path of travel of said tape, a plunger adapted to push the tape against said marking means, thermionic means responsive to electrical energy and associated with said plunger, one of said thermionic means actuating said plunger in responsive to signal energy and the other of said thermionic means being operative to actuate said plunger when said first named thermionic means is inoperative.

HENRI CHIREIX.